US012560842B2

(12) United States Patent
Pouillon

(10) Patent No.: US 12,560,842 B2
(45) Date of Patent: Feb. 24, 2026

(54) VEHICLE PANE HAVING A LIQUID CRYSTAL ARRANGEMENT AND A METHOD FOR PRODUCING A VEHICLE PANE HAVING A LIQUID CRYSTAL ARRANGEMENT

(71) Applicant: Webasto SE, Stockdorf (DE)

(72) Inventor: Jean-Baptiste Pouillon, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 18/740,991

(22) Filed: Jun. 12, 2024

(65) Prior Publication Data

US 2024/0419039 A1 Dec. 19, 2024

(30) Foreign Application Priority Data

Jun. 15, 2023 (DE) ..................... 10 2023 115 711.6

(51) Int. Cl.
*G02F 1/1343* (2006.01)
*B32B 17/10* (2006.01)
*B60J 3/00* (2006.01)
*B60J 3/04* (2006.01)

(52) U.S. Cl.
CPC .. *G02F 1/134309* (2013.01); *B32B 17/10036* (2013.01); *B32B 17/10174* (2013.01); *B32B 17/10504* (2013.01); *B32B 17/10761* (2013.01); *B32B 17/10779* (2013.01);
(Continued)

(58) Field of Classification Search
CPC .......... G02F 1/134309; G02F 1/13452; G02F 1/1334; B32B 17/10036; B32B 17/10174; B32B 17/10504; B32B 17/10761; B32B 17/10779; B32B 17/10807;
(Continued)

(56) References Cited

U.S. PATENT DOCUMENTS

2021/0268774 A1* 9/2021 Klein ................ B32B 17/10504
2023/0339215 A1* 10/2023 Fessemaz ......... B32B 17/10807

FOREIGN PATENT DOCUMENTS

WO 2017135182 A1 8/2017
WO 2023036556 A1 3/2023

OTHER PUBLICATIONS

Office Action issued against corresponding German Application No. 10 2023 115 711.6; mailed Jan. 12, 2024; In German with English Machine Translation (8 pages).

* cited by examiner

*Primary Examiner* — Mariam Qureshi
(74) *Attorney, Agent, or Firm* — Fitch, Even, Tabin & Flannery, LLP

(57) ABSTRACT

A vehicle pane includes a liquid crystal arrangement having a liquid crystal layer and first and second carrier films having, respectively, first and second electrode layers. In a first panel section, the first carrier film is free of the liquid crystal layer and the second carrier film, the first carrier film forming a first contact area with the first electrode layer. In a second panel section, the second carrier film is free of the liquid crystal layer and the first carrier film, the second carrier film forming a second contact area with the second electrode layer. The first and second electrode layers are respectively equipped with an electric contact element in the first contact area and in the second contact area. The second carrier film has a hole in the second contact area, an electric connective material passing through the hole and being in contact with the second contact element.

14 Claims, 4 Drawing Sheets

(52) U.S. Cl.
CPC ......... *B32B 17/10807* (2013.01); *B60J 3/007*
(2013.01); *B60J 3/04* (2013.01)

(58) Field of Classification Search
CPC ....... B32B 17/10293; B60J 3/007; B60J 3/04;
B60J 1/00
See application file for complete search history.

VEHICLE PANE HAVING A LIQUID CRYSTAL ARRANGEMENT AND A METHOD FOR PRODUCING A VEHICLE PANE HAVING A LIQUID CRYSTAL ARRANGEMENT

CROSS-REFERENCE TO RELATED APPLICATION(S)

This application claims the benefit of German Patent Application No. 10 2023 115 711.6 filed Jun. 15, 2023, which is incorporated herein by reference in its entirety.

TECHNICAL FIELD

The invention relates to a vehicle pane having a pane body arrangement having at least one pane body and a liquid crystal arrangement, which has a liquid crystal layer, a first carrier film and a second carrier film, the liquid crystal layer being disposed between the first carrier film and the second carrier film and the first carrier film having a first electrode layer on its side facing the liquid crystal layer and the second carrier film having a second electrode layer on its side facing the liquid crystal layer. The invention also relates to a method for producing this vehicle pane.

BACKGROUND

A vehicle pane of this kind is known from practice and comprises a pane body arrangement which comprises a pane inner body, which faces a vehicle interior, and a pane outer body, which faces the vehicle's surroundings. Between the pane inner body and the pane outer body, a liquid crystal arrangement is received which is designed as a PDLC (polymer dispersed liquid crystal) arrangement, which is electrically switchable and by means of which the transmission behavior for light is controllable as a function of the switching status. In particular, the PDLC arrangement is switchable between a locked state in which it acts as a kind of diffusor and a transmission state in which light can essentially enter through the vehicle pane essentially without being fractured.

The liquid crystal arrangement designed as a PDLC arrangement comprises a liquid crystal layer, which is the actual functional layer and is made of a polymer layer in which liquid crystals are embedded in a droplet shape. The liquid crystal layer is limited by a carrier film on both sides, the carrier film having an electrode layer on its side facing the liquid crystal layer, the electrode layer being made of a conductive layer of the respective plastic film. By supplying electric voltage to the two electrode layers, the liquid crystals of the liquid crystal layer can be oriented for a change of the transmission behavior. In order to be able to connect the electrode layers to a control device and/or a voltage source, corresponding contacts are provided at the lateral edges of the PDLC arrangement.

SUMMARY

The object of the invention at hand is to provide a vehicle pane designed in the manner described above but having an improved contact with the electrode layers and to provide a method for producing a vehicle pane of this kind.

This object is attained by the vehicle pane characterized in that the first carrier film is free of the liquid crystal layer and the second carrier film in a first panel section of the liquid crystal arrangement and forms a first contact area with the first electrode layer and the second carrier film is free of the liquid crystal layer and the first carrier film in a second panel section of the liquid crystal arrangement and forms a second contact area with the second electrode layer, the first electrode layer being equipped with a first electric contact element in the first contact area and the second electrode layer being equipped with a second electric contact element in the second contact area and the second carrier film having a hole in the second contact area, an electric connective material passing through the hole and being contacted with the second contact element. This object is also attained by the method comprising the following steps: a) providing a blank; b) exposing the first electrode layer in a first panel section of the blank by partially removing the second carrier film and the liquid crystal layer to form a first contact area on the first electrode layer; c) applying a first contact element on the first contact area; d) exposing the second electrode layer in a second panel section of the cut blank by partially removing the first carrier film and the liquid crystal layer to form a second contact area on the second electrode layer; e) inserting a hole in the second carrier film in the second contact area; f) applying a second contact element on the second contact area; g) filling the hole with an electric connective material to electrically connect it to the second contact element; h) connecting control lines to the first electric contact element and the electric connective material; and i) connecting the liquid crystal arrangement produced in steps a) to h) to the pane body arrangement.

According to the invention, a vehicle pane is proposed which comprises a pane body arrangement having at least one pane body and a liquid crystal arrangement having a liquid crystal layer, a first carrier film and a second carrier film. The liquid crystal layer is disposed between the first carrier film and the second carrier film. The first carrier film has a first electrode layer on its side facing the liquid crystal layer and the second carrier film has a second electrode layer on its side facing the liquid crystal layer. In a first panel section of the liquid crystal arrangement, the first carrier film is free of the second carrier film and the liquid crystal layer, meaning it can form a first contact area with the first electrode layer, whereas in a second panel section of the liquid crystal arrangement, the second carrier film is free of the first carrier film and the liquid crystal layer, meaning it can form a second contact area with the second electrode layer. The first electrode layer is equipped with at least one first contact element in the first contact area and/or access area. The second electrode layer is equipped with at least one second contact element in the second contact area and/or access area, the second carrier film having a hole in the second contact area, an electric connective material passing through the hole and being in contact with the second contact element.

In the vehicle pane according to the invention, both electrode layers can therefore be contacted from one side when producing the compound structure, which, aside from the liquid crystal arrangement and the pane body arrangement, generally has lamination layers which can be made of PVB or the like, by corresponding control lines being connected to the first contact element of the first electrode layer and to the connective material which passes through the hole of the second carrier film and is electrically connected to the second contact element of the second electrode layer. This simplifies the production process.

The contact elements of both electrode layers are each, for example, designed in the manner of a busbar. Therefore, the first contact element in the first contact area can be a strip-like conductor path which is disposed on the first electrode layer. The second contact element in the second contact area can accordingly be a strip-like conductor path which is disposed on the second electrode layer.

The first contact and/or access area and/or the second contact and/or access area can be formed on the liquid crystal arrangement, where a contacting of the liquid crystal arrangement with a connective element, such as a connective line, is sensible or purposeful locally, for example regarding design and installation position of the liquid crystal arrangement in another protruding body or layers comprising the liquid crystal arrangement. The first and/or second access area can consequently be formed both within a main surface of the liquid crystal arrangement spaced apart from the edge and in edge areas of the liquid crystal arrangement.

In a preferred embodiment, the first access area is formed at a first edge area of the liquid crystal arrangement. In this case, the first carrier film protrudes over the second carrier film and the liquid crystal layer at the first edge area, meaning the first access area and/or first contact area is formed.

In another special embodiment, the second access area is formed at a second edge area of the liquid crystal arrangement. In this case, the second carrier film protrudes over the first carrier film and the liquid crystal layer, meaning the second access area and/or second contact area is formed.

The first access area and the second access area can therefore also be designed as a cutout and/or ledge, in particular in an edge area.

The liquid crystal arrangement of the vehicle pane according to the invention is in particular a PDLC arrangement, which comprises a polymer matrix as a liquid crystal layer, in which liquid crystals are embedded in a droplet shape, and has two carrier films which limit the liquid crystal layer and on each of which an electrode layer is disposed. The liquid crystal layer can also be a generic LC (liquid crystal) layer available in liquid form or a so-called SPD (suspended particle device) layer or even an EC (electrochrome) layer, which can be seen as an alternative in the scope of the invention and is deemed analogous regarding its functionality.

The electrode layers can preferably each be made from a transparent ITO (indium tin oxide) coat of the corresponding carrier film. The carrier films are preferably made of a plastic material which can comprise PET (polyethylene terephthalate) or the like.

In a preferred embodiment of the vehicle pane according to the invention, the connective material, which passes through the hole of the second carrier film, is made of an electrically conductive solder, which can be formed from an alloy, for example, which can comprise tin, zinc, indium, silver and/or copper. A solder of this kind is easily formable and is highly electrically conductive. Preferably, a lead-free connective material is used.

To protect the liquid crystal arrangement from diffusion processes and from the penetration of moisture or the like, it is enclosed by an insulating lamination material on all sides in a preferred embodiment. The lamination material is made of PVB (polyvinyl butyral) film or a different suitable material.

In order for the liquid crystal arrangement to provide a shading arrangement which can be operated like a shutter, i.e., which allows successively shading individual sections of the vehicle pane, at least one of the two electrode layers is divided into several segments, in particular disposed behind one another like strips in a special embodiment of the vehicle pane according to the invention, each of these segments being equipped with a contact element which is disposed in the corresponding contact area of the respective carrier film. If the electrode layer of the second carrier film is segmented, the second carrier film is equipped with at least one hole per segment and a corresponding number of contact elements.

The pane body arrangement of the vehicle pane according to the invention is designed as a compound pane arrangement in a special embodiment, the compound pane arrangement comprising at least one pane outer body and a pane inner body, the liquid crystal arrangement being accommodated between the pane outer body and the pane inner body.

In the method for producing the vehicle pane as detailed by the invention, at least the following steps are executed:

a) providing a blank of a liquid crystal arrangement and optimal cutting of the blank to a liquid-crystal-arrangement cut blank;

b) exposing the first electrode layer in a first panel section of the blank by partially removing the second carrier film and the liquid crystal layer to form a first contact area on the first electrode layer;

c) applying a first contact element on the first contact area;

d) exposing the second electrode layer in a second panel section of the blank by partially removing the first carrier film and the liquid crystal layer to form a second contact area on the second electrode layer;

e) inserting a hole in the second carrier film in the second contact area;

f) applying a second contact element on the second contact area;

g) filling the hole with an electric connective material to electrically connect it to the second contact element;

h) connecting control lines to the electric connective material and the first electric contact element; and i) connecting the liquid crystal arrangement produced in steps a) to h) to the pane body arrangement.

The method according to the invention is therefore designed such that the first electric contact element and the electric connective material, which is connected to the second electric contact element, are accessible from the same side for connecting the control lines. This significantly facilitates production of the vehicle pane according to the invention.

In a special embodiment of the method according to the invention, the second electrode layer is exposed, the second contact element is applied, the hole is inserted in the second carrier film and is filled with the electric connective material (steps d) to g)) before the first electrode layer is exposed and the first contact element is applied (steps b) to c)). Of course, it is also conceivable for steps b) and c) to be executed before steps d) to g).

Steps f) and g) can be executed simultaneously.

In a special embodiment, the hole is produced in the second carrier film in the second contact area before the second contact element is applied on the second contact area. Preferably, the material of the second contact element corresponds to the material of the electric connective material. While the second contact element is applied to the second contact area, the material of the second contact element can thus be inserted in the hole, for example via incorporation, and the hole can be filled with the connective material in the same process step.

To facilitate exposing the corresponding electrode layer, it is purposeful if the carrier film whose electrode layer is being exposed is subjacent and rests on a level carrier surface. Consequently, it is advantageous if the blank of the liquid crystal arrangement is turned between the application of the first contact element and the exposure of the second electrode layer or between the application of the second contact element, the insertion of the hole in the second carrier film and the filling of the hole with the electric connective material and the exposure of the first electrode layer.

To protect the liquid crystal arrangement from undesired diffusions impairing the optical behavior, it is advantageous if the liquid crystal arrangement, in which the two contact elements are applied and the hole is inserted and filled in the second carrier film, is embedded in an electrically insulated lamination material, which is preferably made of lamination films, in particular PVB films.

The control lines, which are connected to the electric connective material and to the first contact element, are connected to and/or retained on the lamination material in a preferred embodiment of the method according to the invention.

For instance, the control lines, which lead to the first contact element and to the electric connective material of the second carrier film, are printed on the lamination material and routed to the first contact element and the electric connective material via corresponding cutouts of the lamination material.

Further advantages and advantageous embodiments of the subject matter of the invention can be derived from the description, the drawing and the claims. Any and all combinations of at least two features disclosed in the description, the claims and/or the figures pertain to the scope of the invention, i.e., each feature mentioned in the description can be part of the claimed subject matter irrespectively of the other features disclosed in the corresponding context.

BRIEF DESCRIPTION OF DRAWINGS

An exemplary embodiment of a vehicle pane according to the invention and an exemplary embodiment of the method according to the invention are shown in a simplified manner in the drawings and are described in more detail in the following.

DETAILED DESCRIPTION

Figure 1:
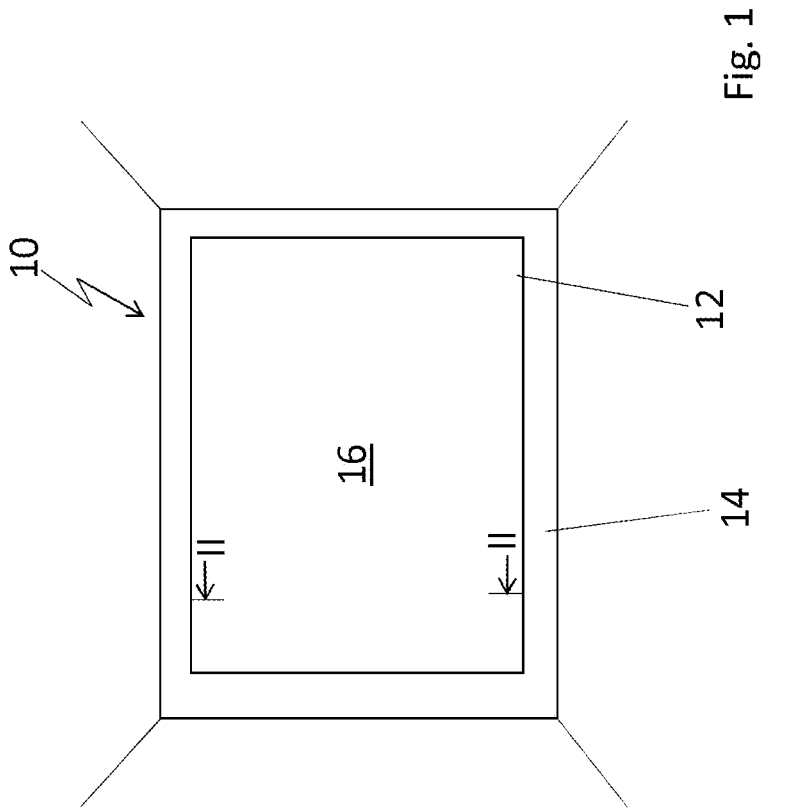
FIG. 1 shows a top view of a vehicle roof having a vehicle pane according to the invention.

In FIG. 1, a vehicle roof 10 of a passenger car is shown, vehicle roof 10 being equipped with a fixed-roof element 12 fixedly and/or immovably connected to a roof frame 14 fixedly attached to the chassis. Fixed-roof element 12 comprises a vehicle pane 16 which is shown in more detail by means of FIGS. 2 and 3 and is equipped with a shading function by means of which light exposure in an interior of the vehicle in question can be controlled via fixed-roof element 12.

Vehicle pane 16 is designed as a compound structure and comprises a pane outer body 18, which is made of a curved glass pane in the case at hand, but can also be made of a planar, curved plastic body made in particular of a polycarbonate material or the like. Pane outer body 18 forms the visible surface of vehicle pane 16 facing the vehicle's surroundings. On the side facing the vehicle interior, vehicle pane 16 comprises a pane inner body 20, which is also made of a curved glass pane, but can also be made of a planar, curved plastic body consisting in particular of a polycarbonate material. Between pane outer body 18 and pane inner body 20, a PDLC (polymer dispersed liquid crystal) arrangement 22 is disposed as a shading arrangement, which is connected to pane outer body 18 via a first lamination layer 24 made of PVB (polyvinyl butyral) and is connected to pane inner body 20 via a second lamination layer 26 also consisting of PVB.

PDLC arrangement 22 comprises a first carrier film 28 and a second carrier film 30, which are each equipped with an electrode layer 32 and/or 34 made of transparent ITO (indium tin oxide). Between carrier film 28 and 30 or rather their electrode layer 32 and 34, respectively, a liquid crystal layer 36 is disposed which forms the functional element of PDLC arrangement 22 and comprises a polymer matrix, in which liquid-crystal droplets are embedded, and can have a thickness of approximately 0.01 mm to approximately 0.02 mm. Carrier film 28 and 30 made in particular of PET each has a thickness of approximately 0.02 mm.

In an alternative embodiment, a generic liquid crystal (LC) arrangement can be used instead of the PDLC arrangement, a continuous or segmented, liquid crystal layer being disposed between the two carrier films, which are each equipped with an electrode layer, in the LC arrangement.

Figure 3:
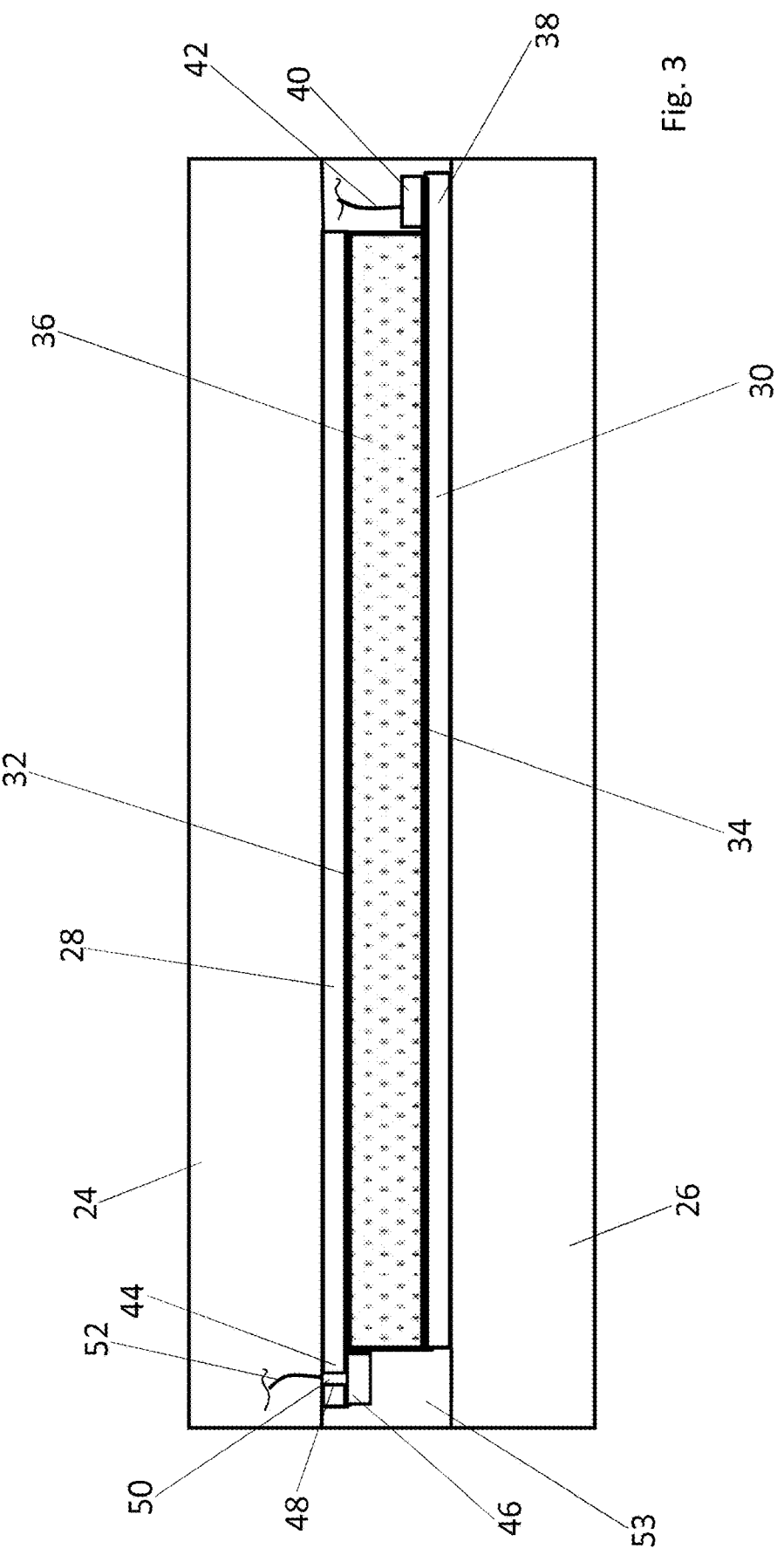
FIG. 3 shows a cut through a PDLC arrangement and the encapsulating lamination of the vehicle pane according to FIG. 2.

As in particular FIG. 3 shows, carrier film 30 forms an edge area 38 in this embodiment, edge area 38 representing a panel section and protruding over carrier film 28 and liquid crystal layer 36 in the lateral direction and forming a first contact area, in which electrode layer 34 is exposed. On edge area 38 or rather the contact area formed by edge area 38, a strip-like contact element 40 is disposed, which follows the edge of liquid crystal layer 36, is designed in the manner of a busbar and is connected to a control device and/or a voltage source (neither shown) via an electric control line 42. Carrier film 28 protrudes over carrier film 30 and liquid crystal layer 36 in the lateral direction in a second edge area 44 representing another panel section, meaning electrode layer 32 is exposed in edge area 44 so as to form a second contact area, which is equipped with a second contact element 46, which, also in the manner of a busbar, is disposed on electrode layer 32 in a strip-like manner following the edge of liquid crystal layer 36.

Carrier film 28 has a hole 48 in the area of edge area 44, an electric connective material 50, which is made of a solder and is in electric contact with second contact element 46, passing through hole 48. An electric control line 52 is connected to electric connective material 50 on the side of carrier film 28 facing away from contact element 46, control line 52 also leading to the control device and/or the voltage source (neither shown). Via control line 42 and 52, an electric field and/or a voltage can consequently be applied to liquid crystal layer 36, meaning it can be switched between a locked state, in which it acts in the manner of a diffusor, and a transmission state, in which the light can pass essentially without being fractured.

Edge area 38 and 44 and contact element 40 and 46 disposed therein are encapsulated in lamination layers 24 and 26 and in a frame-like edge seal 53, which is also made of PVB, i.e., PDLC arrangement 22 is enclosed by PVB from all sides, which is an insulation lamination material.

Vehicle pane 16 is produced in the manner described in the following and in FIGS. 4 and 5.

Figure 4:
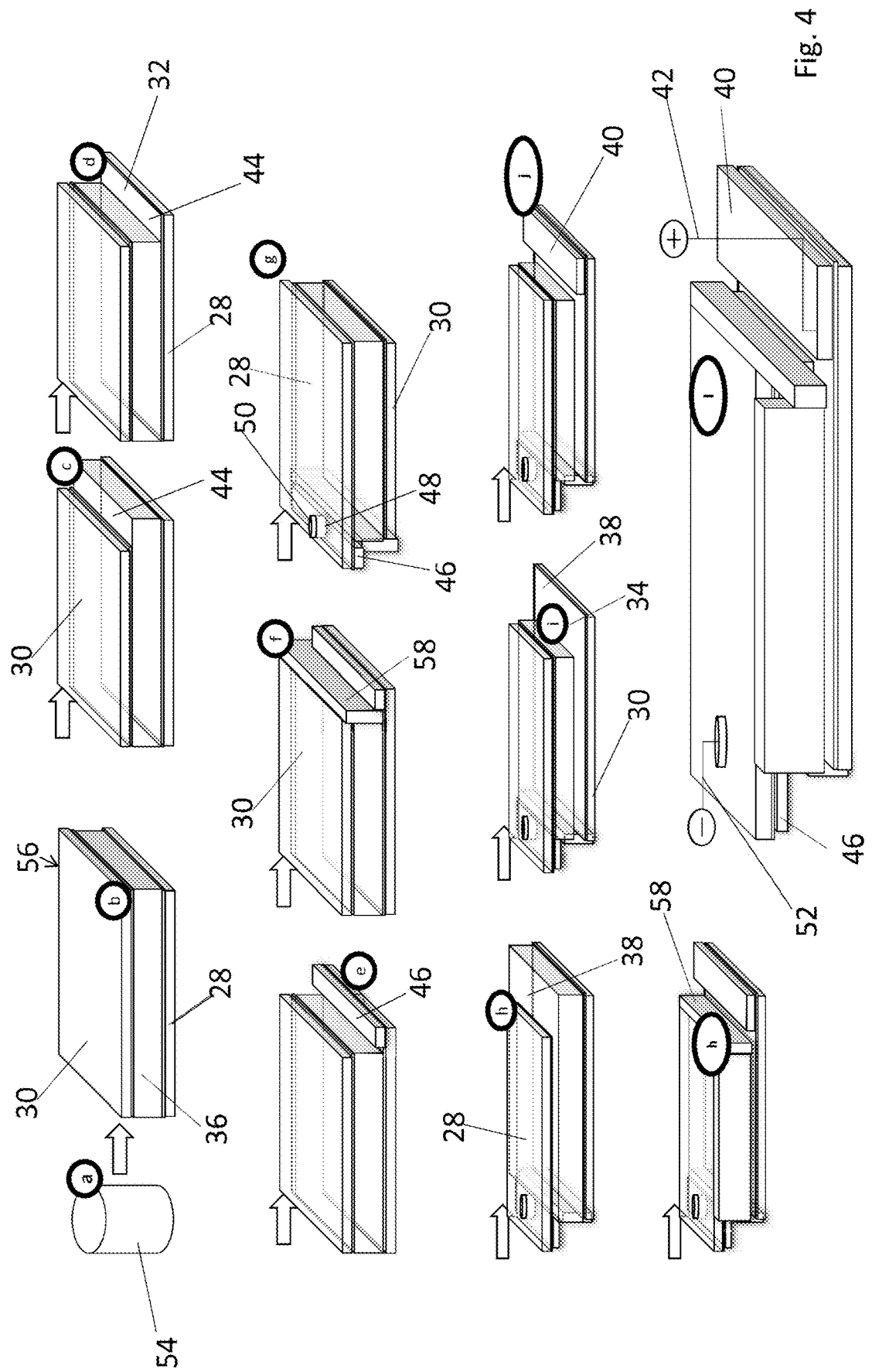
FIG. 4 shows the method steps for producing the PDLC arrangement.
Figure 5:
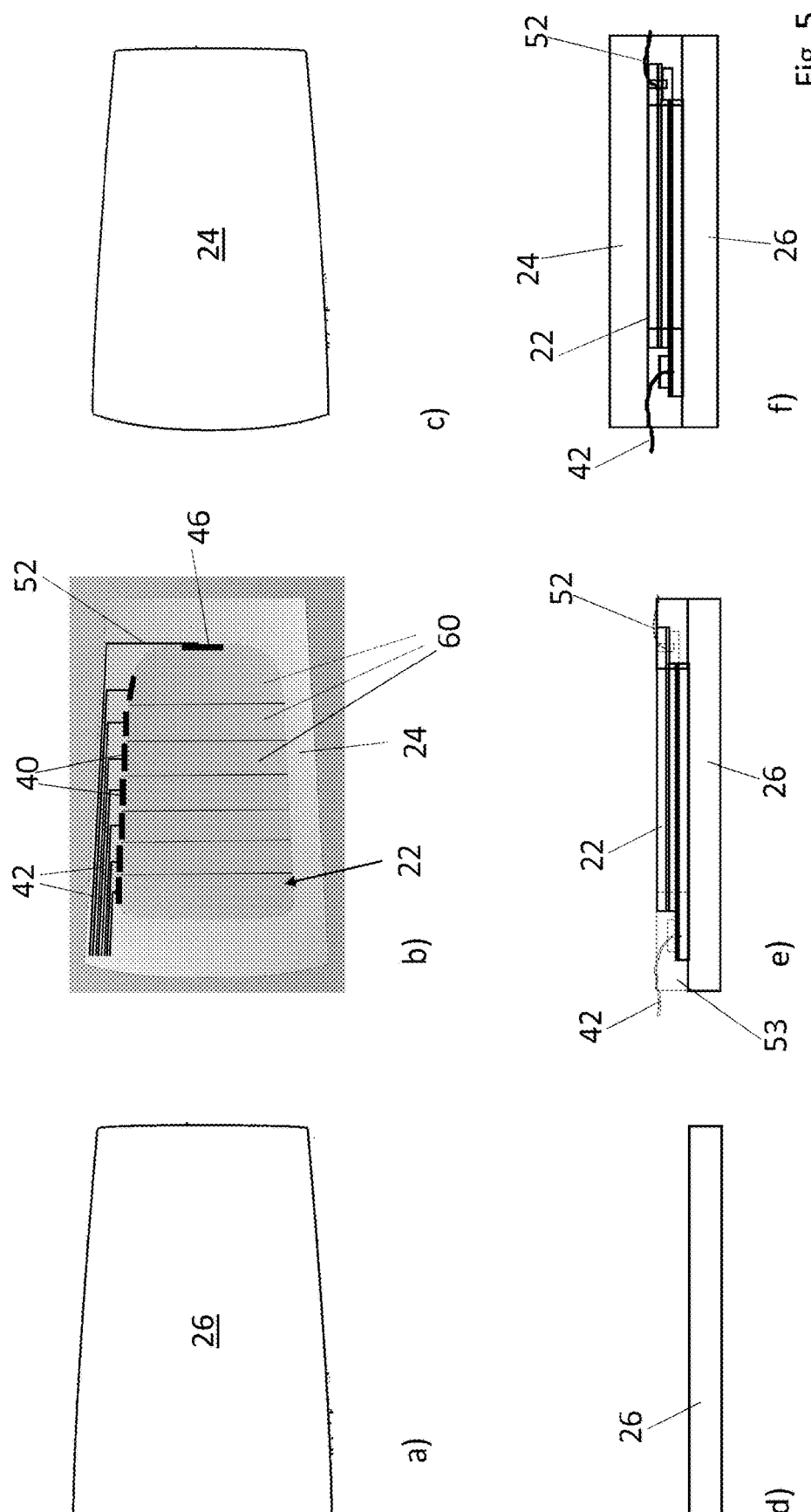
FIG. 5 shows the steps for producing the compound shown in FIG. 3 and made of the PDLC arrangement and the lamination films.

As shown in FIG. 4, a roll of a PDLC blank 54 is provided in step a), PDLC blank 54 being made of a film compound made of both carrier films 28 and 30, electrode layers 32 and 34 disposed thereon and liquid crystal layer 36 disposed between carrier films 28 and 30. A piece of the roll is unrolled in step b) and a PDLC cut blank 56 is made of this unrolled piece, the base surface of PDLC cut blank 56 corresponding to the base surface of finished PDLC arrangement 22. The cutting is executed by means of a suitable cutting tool.

In a subsequent step c), superjacent carrier film 30 made of PET is removed in an edge area 44 following a kiss cutting process. In a step d), which can also be executed simultaneously with step c), liquid crystal layer 36 is also removed in edge area 44, meaning electrode layer 32 of support film 28 is exposed in this edge area 44.

In a subsequent step e), a hole 48 is inserted in carrier film 28 in edge area 44 and strip-like contact element 46, which is designed in the manner of a busbar, is applied on electrode layer 32. In a step f), liquid crystal layer 36 is sealed at the edge via a sealing strip 58, which is a sealing element, is placed on top of the subjacent support film 28 between contact element 46 and liquid crystal layer 36 and is also connected to superjacent carrier film 30.

Subsequently, in a step g), the produced construction is turned so carrier film 28 faces upward and carrier film 30 faces downward. In addition, hole 48 is filled such with an electric connective material 50 that an electric connection is established between contact element 46 now subjacent on carrier film 28 and the upper side of carrier film 28. Hole 48 can be filled with electric connective material 50 at the same time as the strip-like contact element is applied.

In a step h), upper carrier film 28 is removed together with electrode layer 32 in an edge section 38. Following, in a step i), liquid crystal layer 36 is also removed in said edge section 40, meaning electrode layer 34 of now subjacent carrier film 30 is exposed in edge section 38. Then, in a step k), a strip-like electric contact element 40 designed in the manner of a busbar is applied in edge area 38 at a distance to liquid crystal layer 36. Following this, in a step l), liquid crystal layer 36 is sealed at the edge by means of sealing strips 58, which are placed on top of electrode layer 34 as sealing elements and are also connected to superjacent carrier film 28.

Afterward, in a step m), control lines 42 and 52 can be connected to contact element 40 and to electric connective material 50 from the top.

To encapsulate PDLC arrangement 22 thus provided, a lamination film 26 is then provided as a PVB film, as shown in FIGS. 5a and 5d, on which PDLC arrangement 22 is placed together with edge seal 53, as shown in FIGS. 5b and 5e.

Thereafter, as can be seen in FIGS. 5c and 5f, lamination layer 24 is placed. Subsequently, the compound of lamination layer 24 and 26, PDLC arrangement 22 and control lines 42 and 52 including edge seal 53 is subjected to a lamination process.

Figure 2:
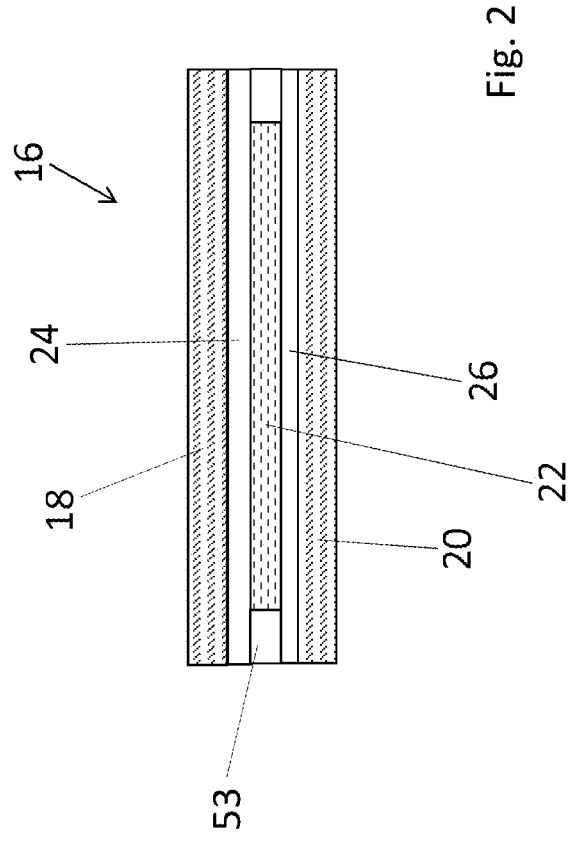
FIG. 2 shows a cut through the vehicle pane according to FIG. 1 along line 1111 in FIG. 1.

The thus produced compound is subsequently laminated between a pane outer body 18 and a pane inner body 20 to produce vehicle pane 16, thus yielding the construction according to FIG. 2.

Alternatively to the processes described above, lamination layers 24, 26 can be disposed and/or inserted between pane outer body 18 and pane inner body 20 with a PDLC arrangement 22 disposed between lamination layers 24, 26 in a lamination tool and be subsequently laminated to yield a vehicle pane 16. Consequently, lamination layers 24, 26, PDLC arrangement 22, pane outer body 18 and pane inner body 20 are provided separately and layered in the lamination tool in order to subsequently be laminated together.

As is shown in particular in FIG. 5b, PDLC arrangement 22 can be segmented to simulate a shutter-like shading of the vehicle interior. For this purpose, in particular electrode layer 34 of carrier film 30 has strip-like, electrically insulated strips 60 disposed one behind the other in the longitudinal roof direction and made of ITO, each individual strip 60 being equipped with a contact element 40 which is disposed in edge area 44 and is connected to a corresponding control line 42 in each case. Electrode layer 32 disposed on carrier film 28 is not segmented and only has contact element 46, which is disposed on an edge section of PDLC arrangement 22 extending in the vehicle transverse direction.

LIST OF REFERENCE NUMERALS

10 vehicle roof
12 fixed-roof element
14 roof frame
16 vehicle pane
18 pane outer body
20 pane inner body
22 PDLC arrangement
24 lamination layer
26 lamination layer
28 carrier film
30 carrier film
32 electrode layer
34 electrode layer
36 liquid crystal layer
38 edge area
40 contact element
42 control line
44 edge area
46 contact element
48 hole
50 electric connective material
52 control line
53 edge seal
54 blank
56 PDLC cut blank
58 sealing strip
60 strip

The invention claimed is:
1. A vehicle pane, comprising a pane body arrangement having at least one pane body and a liquid crystal arrangement, which has a liquid crystal layer, a first carrier film and a second carrier film, the liquid crystal layer being disposed between the first carrier film and the second carrier film and the first carrier film having a first electrode layer on its side facing the liquid crystal layer and the second carrier film having a second electrode layer on its side facing the liquid crystal layer, wherein the first carrier film has no direct contact with the liquid crystal layer and the second carrier film in a first panel section of the liquid crystal arrangement and forms a first contact area with the first electrode layer and the second carrier film has no direct contact with the liquid crystal layer and the first carrier film in a second panel section of the liquid crystal arrangement and forms a second contact area with the second electrode layer, the first electrode layer being equipped with a first electric contact element in the first contact area and the second electrode layer being equipped with a second electric contact element in the second contact area and the second carrier film having a hole in the second contact area, an electric connective material passing through the hole and being contacted with the second contact element, wherein the first carrier film protrudes over the second carrier film and the liquid crystal layer in a first edge area of the liquid crystal arrangement and forms the first contact area and the second carrier film protrudes over the first carrier film and the liquid crystal layer in a second edge area of the liquid crystal arrangement and forms the second contact area, wherein a first electric control line attaches to the first electrode at the first contact area and a second electric control line attaches to the second electrode at the second contact area and extends through the second carrier film, and wherein both the first electric control line and the second electric control line extend to a same side of the vehicle pane.

2. The vehicle pane according to claim 1, wherein the first contact element forms a strip-like conductor path in the first contact area, the strip-like conductor path being disposed on the first electrode layer.

3. The vehicle pane according to claim 1, wherein the second contact element forms a strip-like conductor path in the second contact area, the strip-like conductor path being disposed on the second electrode layer.

4. The vehicle pane according to claim 1, wherein the connective material is connected to an electric control line on its side facing away the second contact element.

5. The vehicle pane according to claim 1, wherein the liquid crystal arrangement is enclosed by an insulating lamination material on all sides.

6. The vehicle pane according to claim 1, wherein at least one of the two electrode layers is divided into several segments and each of these segments is equipped with a contact element which is disposed in the corresponding contact area of the respective carrier film.

7. The vehicle pane according to claim 1, wherein the pane body arrangement comprises a pane outer body and a pane inner body and the liquid crystal arrangement is disposed between the pane outer body and the pane inner body.

8. A method for producing the vehicle pane of claim 1, the method comprising the following steps: a) providing a blank; b) exposing the first electrode layer in a first panel section of the blank by partially removing the second carrier film and the liquid crystal layer to form a first contact area on the first electrode layer; c) applying a first contact element on the first contact area; d) exposing the second electrode layer in a second panel section of the cut blank by partially removing the first carrier film and the liquid crystal layer to form a second contact area on the second electrode layer; e) inserting a hole in the second carrier film in the second contact area; f) applying a second contact element on the second contact area; g) filling the hole with an electric connective material to electrically connect it to the second contact element; h) connecting control lines to the first electric contact element and the electric connective material; and i) connecting the liquid crystal arrangement produced in steps a) to h) to the pane body arrangement.

9. The method according to claim 8, wherein steps d) to g) are executed before steps b) and c).

10. The method according to claim 8, wherein steps f) and g) are executed simultaneously.

11. The method according to claim 8, wherein the blank of the liquid crystal arrangement is turned between the application of the first contact element and the exposure of the second electrode layer or between the application of the second contact element, the insertion of the hole in the second carrier film and the filling of the hole with the electric connective material and the exposure of the first electrode layer.

12. The method according to claim 8, wherein the liquid crystal arrangement is embedded in an electrically insulating lamination material which is preferably formed from lamination films.

13. The method according to claim 8, wherein the control lines are connected to the lamination material.

14. The method according to claim 13, wherein the control lines are printed on the lamination material.

\* \* \* \* \*